(12) United States Patent
Kadar-Kallen et al.

(10) Patent No.: US 8,911,157 B2
(45) Date of Patent: Dec. 16, 2014

(54) OPTICAL CONNECTOR WITH FERRULE INTERFERENCE FIT

(75) Inventors: Michael Aaron Kadar-Kallen, Harrisburg, PA (US); Daniel E. Wertman, Mechanicsburg, PA (US); Soren Grinderslev, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 318 days.

(21) Appl. No.: 13/503,130

(22) PCT Filed: Jun. 1, 2010

(86) PCT No.: PCT/US2010/036852
§ 371 (c)(1),
(2), (4) Date: Aug. 10, 2012

(87) PCT Pub. No.: WO2010/141434
PCT Pub. Date: Dec. 9, 2010

(65) Prior Publication Data
US 2012/0294573 A1 Nov. 22, 2012

Related U.S. Application Data

(63) Continuation-in-part of application No. 12/475,887, filed on Jun. 1, 2009, now Pat. No. 8,123,417.

(51) Int. Cl.
*G02B 6/36* (2006.01)
*G02B 6/38* (2006.01)
*G02B 6/32* (2006.01)

(52) U.S. Cl.
CPC ............... *G02B 6/3869* (2013.01); *G02B 6/32* (2013.01)
USPC .......................................................... 385/79

(58) Field of Classification Search
USPC .......................................................... 385/79
See application file for complete search history.

(56) References Cited

U.S. PATENT DOCUMENTS

| 4,907,853 A | 3/1990 | Hiratsuka |
| 5,216,734 A | 6/1993 | Grinderslev |

(Continued)

FOREIGN PATENT DOCUMENTS

| EP | 1884809 A1 | 2/2008 |
| JP | 1074510 A | 3/1989 |

(Continued)

OTHER PUBLICATIONS

Supplementary European Search Report, Mail Date Oct. 30, 2012, EP 10 78 3907, Application No. 10783907.8-1524 / 2438482.

(Continued)

*Primary Examiner* — Sung Pak

(57) ABSTRACT

An optical connector having a front and back orientation, the connector comprising: (a) a ferrule comprising a first material having a first coefficient of thermal expansion (COE), and having a first diameter at a first temperature, and a second diameter at a second temperature, the ferrule also comprising an endface; (b) a housing comprising a second material having a second COE, the housing having a restricted borehole having a third diameter at the first temperature, and a fourth diameter at the second temperature; (c) a resilient member disposed in the housing and in contact with the ferrule to apply a forward urging force to the ferrule; (d) wherein the connector has a first and second configuration, in the first configuration, the second COE is greater than the first COE, the first diameter is greater than the third diameter such that the connector is in an interference state at the first temperature, and the second diameter is less than the fourth diameter such that the connector is in a clearance state at the second temperature, in the second configuration, the second COE is less than the first COE, the first diameter is less than the third diameter such that the connector is in the clearance state at the first temperature, and the second diameter is greater than the fourth diameter such that the connector is in the interference state at the second temperature; and (e) wherein clearance between the ferrule and the housing is less than 0.5 μm at room temperature.

26 Claims, 6 Drawing Sheets

(56) References Cited

U.S. PATENT DOCUMENTS

| | | |
|---|---|---|
| 5,396,572 A | 3/1995 | Bradley et al. |
| 5,422,970 A | 6/1995 | Miller et al. |
| 5,425,039 A | 6/1995 | Hsu et al. |
| 5,917,975 A | 6/1999 | Bloom |
| 6,141,098 A | 10/2000 | Sawatari et al. |
| 6,155,146 A | 12/2000 | Andrews et al. |
| 6,621,957 B1 | 9/2003 | Sullivan et al. |
| 6,885,797 B2 | 4/2005 | Lee et al. |
| 7,063,466 B2 | 6/2006 | Ferguson |
| 7,559,701 B2 | 7/2009 | Knobloch et al. |
| 2007/0013723 A1 | 1/2007 | Souza et al. |
| 2007/0183723 A1 | 8/2007 | Matsumoto et al. |
| 2008/0050073 A1 | 2/2008 | Kadar-Kallen et al. |
| 2008/0226236 A1 | 9/2008 | Pepin et al. |

FOREIGN PATENT DOCUMENTS

| | | |
|---|---|---|
| WO | 87/01464 | 3/1987 |
| WO | 02/079840 A1 | 10/2002 |

OTHER PUBLICATIONS

International Search Report and Written Opinion dated Jul. 22, 20120 for PCT/US10/036852.

Naganuma, Norihisa, English Translation of JP64-74510, Mar. 1989.

OPTICAL CONNECTOR WITH FERRULE INTERFERENCE FIT

REFERENCE TO RELATED APPLICATION

This applications claims the priority of PCT/US2010/036852, filed Jun. 1, 2010, which claims priority to U.S. patent application Ser. No. 12/475,887 filed Jun. 1, 2009, which is incorporated herein by reference.

FIELD OF INVENTION

The present invention relates generally to an optical connector, and, more specifically, to an optical connector configured to transition between an interference state and a clearance state.

BACKGROUND OF INVENTION

Optical fiber connectors are a critical part of essentially all optical fiber communication systems. For instance, such connectors are used to join segments of fiber into longer lengths, to connect fiber to active devices (e.g., radiation sources, detectors and repeaters), and to connect fiber to passive devices (e.g., switches, multiplexers, and attenuators). A typical optical fiber connector comprises a housing and a ferrule within the housing. The ferrule has one or more boreholes, and a fiber secured in each borehole such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with the optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber endface, thereby increasing reflective loss and scattering.

To avoid problems of debris and vibration, a connector has been developed which expands the optical beam and transmits it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing, which is configured to mate with the outer housing of a mating connector, typically through a screw connection. Contained within the outer housing are a number of inner assemblies or "inserts." Each insert comprises an insert housing, a ferrule assembly contained within the insert housing and adapted to receive a fiber, and a ball lens at a mating end of the insert housing optically connected to the fiber. The ball lens serves to expand and collimate light at the connector interface. When two expanded beam connectors are mated, there is an air gap between the ball lenses of each pair of optically coupled inserts.

Tyco Electronics Corporation (Harrisburg, Pa.) currently offers a line of expanded beam connectors under the brand name PRO BEAM®. Referring to FIGS. 4(a) and (b), the single mode and multimode PRO BEAM connector inserts 41, 42 are shown schematically. The single mode (SM) expanded beam connector 41 uses a PC-polished ferrule 43 that is in contact with a glass ball lens 44. (Note: a Physical Contact (PC) polish is slightly rounded, and the surface of the fiber is nominally perpendicular to the fiber axis. A flat-polished ferrule can also be used for single mode with good results because the relatively small radius of the lens will still achieve PC-contact with the fiber endface. See, for example, Telcordia GR-326.) The lens 44 is AR coated on one side for a glass/glass interface, and, on the other side, for an air/glass interface. The multimode (MM) connector 42 of FIG. 4(b) uses a flat-polished ferrule 45, which is held, at a fixed distance from the ball lens 46 by means of a stop or a spacer 47 that is located near the ball lens. The ball lens has an antireflective (AR) coating 48 for an air/glass interface to reduce Fresnel losses. The "single mode" fiber-touching-the-lens design can also be used with multimode fiber, producing a lower-loss connector because of the elimination of the fiber-to-air Fresnel-loss interfaces. Although the multimode and single mode expanded beam connectors offered by Tyco Electronics have consistently met industry requirements, Applicants have identified a need for improved performance, particularly over a broad temperature range.

The prior art expanded beam connectors shown in FIGS. 4(a) and 4(b) involve a clearance fit between the housing 49, 50 and the ferrule 43, 45, respectively. Applicants have determined that this clearance fit is one of the underlying causes of the diminished optical performance of the connectors over a wide temperature range. Specifically, the clearance fit requires tolerance between the housing and the ferrule, which leads to tolerance buildup (e.g., in the range of 0.5 to 2.5 microns.) Even at low temperatures, excess clearance between the ferrule and the borehole of the housing within design limits has been found to be detrimental to performance. As temperatures increase, the housing tends to expand to a greater extent than the ferrule, therefore amplifying the tolerance buildup between the ferrule and the housing. This tolerance buildup coupled with disparate thermal expansion of the housing and ferrule causes an offset and skewing effect of the ferrule within the housing. For example, referring to the connector 30 in FIG. 3, as spring 33 pushes the rear of the ferrule 31 forward, the rear can be pushed to one side of the housing 32 due to the tolerance $d_T$ between the ferrule 31 and the housing 32, causing the ferrule to skew (as indicated by the arrows), and either an offset occurs at its endface or a tilt of the ferrule can create an angle between the fiber axis and the lens axis which will result in large insertion loss variations. Thus, at higher temperatures, the skew and offset of the ferrule caused by tolerance buildup and thermal expansion becomes more severe, often to the point of diminishing optical performance below accepted standards.

Although an interference fit between the ferrule and housing would eliminate this tolerance buildup and its negative effects, Applicants recognize that, at some high temperature, the expansion of the housing becomes so great that it pulls the endface of the ferrule 31 away from the lens 35 to the point of compromising the physical contact between the two. Applicants also recognize that this temperature may be within the expected operating conditions of the connector, especially for a fiber/lens contact design as disclosed in FIG. 3.

Therefore, a need exists for a connector design that delivers desired performance over a wide range of operating temperatures. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a connector configuration that not only compensates for disparate thermal expansion/contraction between the housing and the ferrule, but also exploits this difference by enabling the connector to operate in a clearance state and in an interference state, thus realizing the benefits both states offer. More specifically, in the clearance state, the ferrule is able to move within the housing, allowing it to be biased relative to the housing such that it maintains a certain axial position relative to the housing. Accordingly, when the connector transitions from the clearance state to the interference state, the ferrule is positioned correctly within the housing.

Additionally, because the connector is configured to transition between the clearance and interference states, relatively little clearance is required between the ferrule and the housing. In other words, unlike prior art connectors in which abundant clearance was required to ensure a clearance fit across a wide operating temperature range, the connector of the present invention need not be configured in such a way. To the contrary, the connector is configured to exploit the interference state and the associated rigid alignment among the components to deliver high performance. Thus, the low clearance of the connector of the present invention not only facilitates the connector's transition to an interference state (and thus the alignment benefits such a state offers), but also improves synergistically the radial alignment of the ferrule in the housing while the connector is in its clearance state.

Additionally, because the connector can operate in either an interference or clearance state, it allows the connector to have a wide operating temperature range. For example, in one embodiment, the connector operates in an interference state within normal temperatures. If the temperature becomes high enough or low enough, however, the connector transitions from the interference state to the clearance state, thereby allowing the ferrule to move within the housing as the dimensions of these components change relative to each other. At this point, a biasing force against the ferrule controls the axial position of the ferrule. For example, a spring biases the ferrule forward so that it maintains physical contact with a lens, or otherwise maintains contact with a stop or other structure. Therefore, by using two ways of holding the ferrule in the housing depending on temperature—e.g., an interference fit within a normal temperature range and a clearance fit with a forward bias at relatively high/low or extreme temperatures—the connector of the present invention is optimized for performance across a broad temperature range.

Accordingly, one aspect of the present invention is an optical connector comprising a ferrule held in a housing generally with an interference fit, and held at relatively high/low or extreme temperatures with a clearance fit and a forward bias. In one embodiment, the optical connector comprises: (a) a ferrule comprising a first material having a first coefficient of thermal expansion (COE), and having a first diameter at a first temperature, and a second diameter at a second temperature, the ferrule also comprising an endface; (b) a housing comprising a second material having a second COE, the housing having a restricted borehole having a third diameter at the first temperature, and a fourth diameter at the second temperature; (c) a resilient member disposed in the housing and in contact with the ferrule to apply a forward urging force to the ferrule; (d) wherein the connector has a first and second configuration, in the first configuration, the second COE is greater than the first COE, the first diameter is greater than the third diameter such that the connector is in an interference state at the first temperature, and the second diameter is less than the fourth diameter such that the connector is in a clearance state at the second temperature, in the second configuration, the second COE is less than the first COE, the first diameter is less than the third diameter such that the connector is in the clearance state at the first temperature, and the second diameter is greater than the fourth diameter such that the connector is in the interference state at the second temperature. In one embodiment, the clearance between the ferrule and the housing is less than 0.5 µm at room temperature. In another embodiment, the connector is an interference state for a majority of the operating temperature range.

Another aspect of the present invention is a method of manufacturing the connector by assembling the connector while in a clearance state and then transitioning the connector to an interference state. In one embodiment, the method comprises: (a) either heating the housing or cooling the ferrule such that clearance between the outer diameter of the ferrule and the inner diameter of the restricted borehole is achieved; (b) after step (a), inserting the ferrule into the restricted borehole of the housing; (c) disposing the resilient member in the housing to urge the ferrule forward relative to the housing, and (d) after steps (b) and (c), allowing the temperature of the housing to drop or the temperature of the ferrule to rise such that the connector transitions from a clearance state to an interference state while the ferrule is biased forward with the resilient member.

Yet another aspect of the invention is a method of disassembling the connector by transitioning it from an interference state to a clearance state. In another embodiment, the method comprises: (a) providing the connector comprising a ferrule, a housing and a resilient member, the ferrule comprising a first material and having a first diameter at the first temperature and a second diameter at a second temperature higher than the first temperature, the housing comprising a second material having a coefficient of thermal expansion different form that of the first material, and having a restricted borehole having a third diameter at the first temperature and a fourth diameter at the second temperature, the connector has a first and second configuration, in the first configuration, the second COE is greater than the first COE, the first diameter is greater than the third diameter such that the connector is in an interference state at the first temperature, and the second diameter is less than the fourth diameter such that the connector is in a clearance state at the second temperature, in the second configuration, the second COE is less than the first COE, the first diameter is less than the third diameter such that the connector is in the clearance state at the first temperature, and the second diameter is greater than the fourth diameter such that the connector is in the interference state at the second temperature; (b) either heating the connector of the first configuration to the second temperature or cooling the connector of the second configuration to the first temperature such that the connector transitions to a clearance state, the first and second temperature being within the operating temperature range; and (c) removing the ferrule form the housing.

DETAILED DESCRIPTION

Figure 1A:
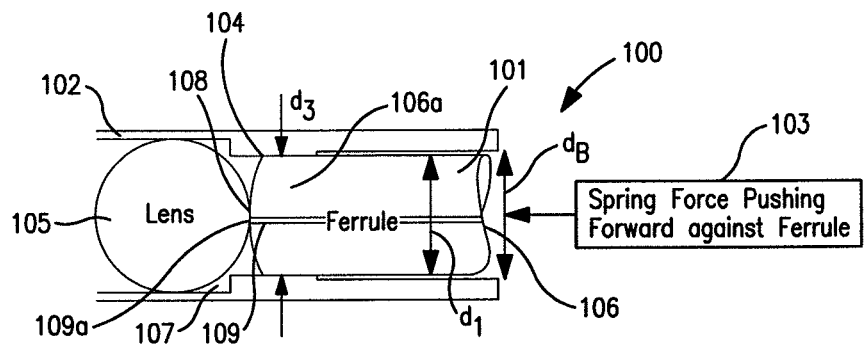
FIGS. 1(a) and 1(b) show a cross-sectional schematic of a first configuration of the connector of the present invention in an interference state and in a clearance state, respectively.
Figure 1B:
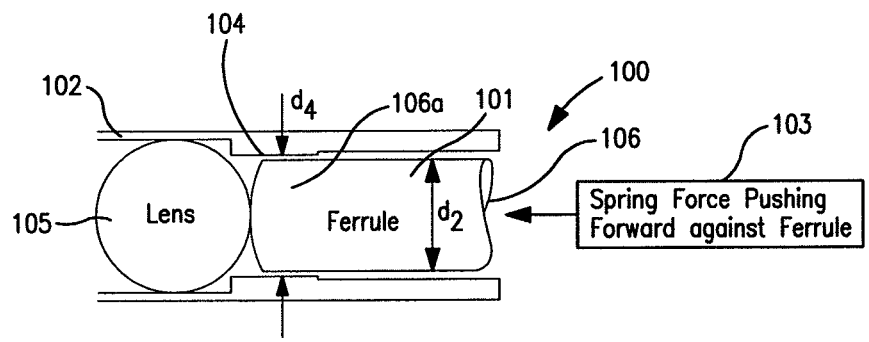
Figure 3:
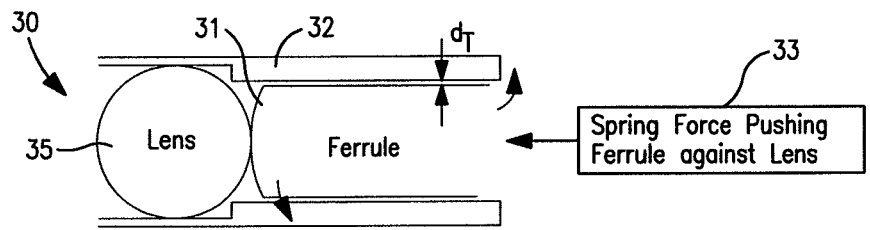
FIG. 3 shows a cross-sectional schematic of a prior art connector.

Referring to FIGS. 1(a) and 1(b), a schematic of an optical connector 100 of the present invention having a first configuration is shown in an interference state and in a clearance state, respectively. The connector has a front-and-back orientation and comprises: (a) a ferrule 101 comprising a first material having a first coefficient of expansion (COE), and having a first diameter $d_1$ at a first temperature, and a second diameter $d_2$ at a second temperature, the ferrule also comprising an endface 108, and containing at least one fiber 109 having a fiber end 109a presented at the endface; (b) a spring 103 disposed behind the ferrule 101 and in contact with the ferrule to apply a forward urging force to the ferrule; and (c) a housing 102 comprising a second material having a second COE, the housing defining a borehole 106 having a diameter $d_B$ greater than the first or second diameters, and an interface portion 104 defining a restricted borehole 106a having a third diameter $d_3$ at said first temperature, and a fourth diameter $d_4$ at said second temperature.

The connector is configured in one of two ways: in a first configuration, the second COE is greater than the first COE, and in the second configuration, the second COE is less than the first COE.

In the first configuration, the first diameter $d_1$ is greater than the third diameter $d_3$ such that the connector is in the interference state, and the second diameter $d_2$ is less than the fourth diameter $d_4$ such that the connector is in the clearance state. Accordingly, FIG. 1(a) shows the connector of the first configuration in its interference state, and FIG. 1(b) shows the connector in its clearance state.

Figure 1C:
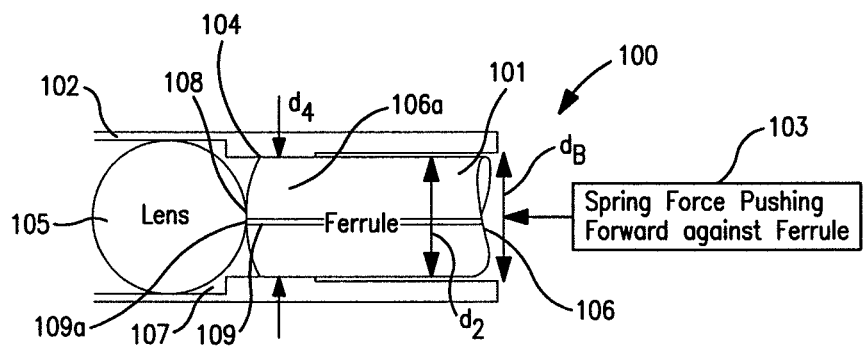
FIGS. 1(c) and 1(d) show a cross-sectional schematic of a second configuration of the connector of the present invention in an interference state and in a clearance state, respectively.
Figure 1D:
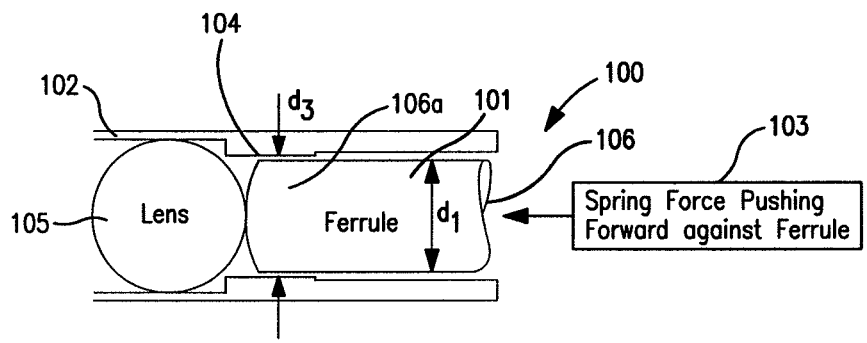

In the second configuration, the first diameter $d_1$ is less than the third diameter $d_3$ such that the connector is in the clearance state, and the second diameter $d_2$ is greater than the fourth diameter $d_4$ such that the connector is in the interference state. Referring to FIGS. 1(c) and 1(d), FIG. 1(c) shows the connector is its interference state, and FIG. 1(d) shows the connector in its clearance state. (FIGS. 1(c) and 1(d) are essentially the same as FIGS. 1(a) and 1(b), respectively, except FIGS. 1(c) and (d) depict the second configuration of the connector 100.)

An important aspect of the connector of the present invention is the narrow clearance between the ferrule and the restricted borehole. Specifically, the clearance is kept low to hold the ferrule in close axial alignment within the borehole. Such a close clearance was generally not desirable in prior art clearance fit connectors because more clearance was required to ensure a clearance fit. However, because the connector of the present invention is configured to transition between a clearance and interference state, it can accommodate a very narrow clearance. For example, in one embodiment, the clearance at room temperature is less than that needed to ensure a clearance fit. Although this clearance may vary depending on the tolerances of the components used, in one embodiment, it is less than 0.5 μm at room temperature. By contrast, historically a clearance of about 0.5 to 3.5 μm between the outer diameter of the ferrule and the borehole was needed to ensure a clearance fit and thus compensate for anomalies in the roundness of the components and their misalignment.

As stated above, the relationship between the first and third, and second and fourth diameters depends on the configuration of the connector. For example, considering the first configuration, the COE of the first material is less than that of the second material. This means that, for a given increase in temperatures, the first material will expand less than the second material. When the connector of a first configuration is below a temperature, referred to herein as the "transition temperature," $d_1$ is greater than $d_3$, and thus, the interface portion of the housing holds the ferrule with an interference fit to position it axially. However, when the temperature rises above the transition temperature, and the relationship between the ferrule and the interface portion changes such that $d_2$ is less than $d_4$, the fit at the interface portion transitions from an interference fit to a clearance fit as the ferrule is now able to move within the interface portion. Because the ferrule is free to move in the borehole 106 of the housing in this state, the biasing force of the spring 103 urges the ferrule 101 forward, thereby serving to position the ferrule axially in the housing.

On the other hand, in the second configuration, the COEs of the first and second materials are reversed, such that the COE of the first material is greater than that of the second material. Consequently, the first material expands/shrinks more than the second material for a given change in temperature. In this embodiment, when the connector is below the transition temperature, $d_1$ is less than $d_3$, thus, the ferrule is free to move within the interface portion of the housing, thereby allowing the spring to bias the ferrule forward. However, when the temperature exceeds the transition temperature, the relationship between the interface portion and the ferrule changes, and the diameter of the ferrule expands to $d_2$, which is greater than $d_4$, thereby creating an interference fit.

The COEs of the materials and the clearance between the ferrule and the interface portion are configured to establish the transition temperature. The transition temperature may be relatively high, relatively low, inside the operating temperature range, or outside the operating temperature range, depending on performance objectives. As mentioned above, in one embodiment, the connector is essentially in an interference state at room temperature, therefore, the transition temperature in this embodiment will be above or below room temperature. In this respect, it is generally preferable, although not necessary, that the transition temperature be at the higher or lower end of the expected operating temperature range such that the connector is an interference state for a majority, if not all, of its operating temperature range. In this way, the clearance fit acts as more of a safety feature at extreme high/low temperatures or to facilitate assembly. Accordingly, in one embodiment, the transition temperature is in or above the upper ⅓ of the operating temperature range for the first configuration, or is in or below the lower ⅓ of the operating temperature range for the second configuration. For example, in this embodiment, if the operating temperature range is −46 to 71° C. (based on MIL-DTL-83526/20A specification), the transition temperature for the first configuration would be above about 32° C., and the transition temperature for the second configuration would be below about −7° C. Accordingly, in this embodiment, the first configuration of the connector would operate in the interference state up to at least 32° C. before transitioning to a clearance state, while the second configuration of the connector would operate in the interference state down to at least −7° C. before transitioning to a clearance state. In another embodiment, the transition temperature for the first configuration is in or above the upper ⅒ of the operating range, or is in or below the lower ⅒ of the operating range for the second configuration. For example, in this embodiment, if the operating temperature range is again −46 to 71° C., then the transition temperature for the first configuration would be above about 57° C., and the transition temperature for the second configuration would be below about −32° C. Accordingly, in this embodiment, the first configuration of the connector would operate in the interference state up to at least 57° C., while the second configuration of the connector would operate in the interference state down to at least −32° C. In another embodiment, the transition temperature is beyond the expected operating temperature range such that the connector has an interference fit for essentially the entire operating temperature range. Alternatively, the connector may be configured to have the transition temperature closer to ambient than to the extremes, for example, in the +25 to +40° C. range for the first configuration, or +20 to 0° C. range for the second configuration.

As indicated above, the configuration of the connector (first or second) depends upon the selection of COEs of the first and second materials. One of skill in the art can readily determine the COE of the materials used. The transition temperature depends upon the COEs of the materials used and the relative sizes of the ferrule and the restricted borehole. For example, referring to FIG. 6, a chart showing thermal expansion of the ferrule and restricted borehole as function of temperature for the first configuration is shown. The dark line corresponds to the ferrule diameter, while the three lighter lines correspond to different diameters of the restricted borehole 106a. Specifically, at 23° C., bore 1 corresponds to a 2498.0 μm borehole, bore2 corresponds to a 2498.5 μm borehole, and bore3 corresponds to a 2499 μm borehole. The ferrule at 23° C. has a diameter of 2499 μm. The slope of these lines depends on the COEs of the respective materials of the ferrule and housing. If the COE of housing is greater than that of ferrule, the slope of the restricted borehole line will be greater than that of the ferrule line, necessarily meaning that the lines will cross at some temperature. That temperature is the transition temperature.

Figure 6:
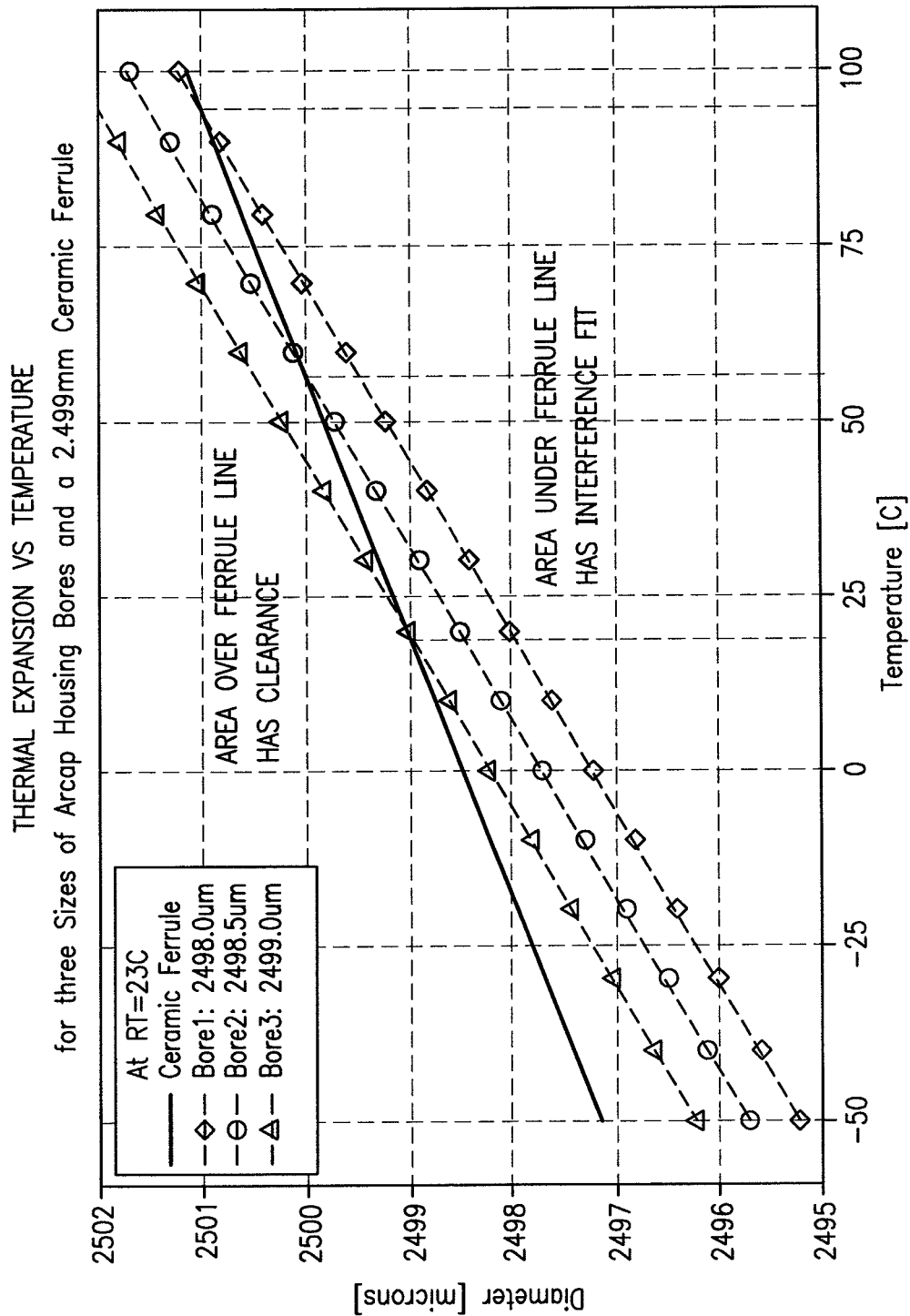
FIG. 6 is a chart showing thermal expansion of the ferrule and restricted borehole as function of temperature for the first configuration.

It should be appreciated that, practically speaking, the ferrule and borehole will have tolerances resulting in acceptable variation on either side of the lines depicted in FIG. 6. Consequently, the transition temperature for a product line of connectors may not be one precise number, but rather a range depending upon the relative tolerances of the components packaged together. As the tolerance among the components increases, so does the range of transition temperatures. Generally, although not necessary, it is desirable to engineer/optimize the component COEs, diameters, and tolerances such the entire range of transition temperatures is at the extremes of the operating temperature range. In other words, the connector should be optimized to consider the range of transition temperatures, and not just the nominal transition temperature based on the nominal dimensions of the components. Such an optimization would be obvious to one of skill in the art in light of this disclosure.

In one this example, the ferrule is made of ceramic and the housing defining the restricted borehole comprises Arcap®. Because the COE of Arcap is greater than that of ceramic, the slope of the restricted borehole line is larger than that of the ferrule line, necessarily meaning that the lines will cross at some temperature.

Where the ferrule line cross each of the borehole lines determines the transition temperature for the ferrule and the corresponding restricted borehole of a given diameter. For example, the transition temperature for the ferrule and bore 1 is about 92-97° C., for bore 2 it is about 57-62° C., and for bore3 it is about 18-23° C. Because COEs are defined for most materials used in connectors, one of skill in the art can readily size the ferrule and the restricted borehole to define a transition temperature within a certain range. When sizing the ferrule and restrictive borehole it is important that the contraction force of the interface portion around the ferrule does not exceed the elastic deformation of the housing and ferrule material. For example, in the first configuration, after the connector is subjected to colder temperatures, it needs to return to its original dimension at elevated temperatures.

The connector is described in greater detail below. Throughout this description, reference is made, for illustrative purposes, to an expanded beam connector 200 (FIG. 2) having an insert-type housing 202. It should be understood, however, that the invention is not limited to this embodiment and may be embodied in any optical connector or optical interface having a ferrule contained in a housing, including, for example, a discrete connector (e.g. a single ferrule connector) or an optical interface of a device such as a transceiver.

The ferrule 101 functions to hold the fiber 109 in precise radial position relative to the housing and to present the fiber end 109a at its endface 108 for optical coupling with the lens 105 or mating device. The term ferrule is used synonymously herein with ferrule assembly. (Referring to FIG. 2b, a typical ferrule assembly 215 typically includes a plurality of components, including a ferrule 201, as described above, and a ferrule holder or base 212, which may have a collar 213 or other structure to provide a surface against which the spring 203 urges the ferrule assembly forward.) Suitable ferrules configurations include any cylindrical or rectangular shapes, and single fiber or multifiber types (e.g., MT-type ferrules). (In this respect, it should be understood that the term diameter as used herein to describe the relative diameters of the ferrule and restricted boreholes, are not limited to circular cross sections but apply to any distance as measured through the cross sectional center.) Such ferrules and ferrule assemblies are well known. Indeed, one benefit of the configuration of the present invention is that ordinary and standard ferrules may be used. No special machining or molding is required.

The ferrule comprises a first material, which may be, for example, ceramic, polymer/plastics, metal, glass and composites. In one embodiment, the ferrule comprises ceramic that has a COE comparable to that of fiber. Again, such ferrule materials are well known.

The housing 202 functions to hold the ferrule assembly and, optionally, a lens 205, in precise axial and radial alignment. The housing 202 comprises a second material having a second COE. Examples of suitable materials include, for example, ceramics, polymer/plastics, metals including alloys, such as stainless steel and Arcap®, and composite materials. In one embodiment, the material is Arcap.

The housing 202 defines at least one borehole 206 and a restricted borehole 206a. The borehole has a diameter no less than the diameter of the ferrule 201 at any temperature within the temperature range. Accordingly, there is a clearance fit between the ferrule 201 and the borehole 206 housing, regardless of the temperature, allowing the ferrule 201 to move within the borehole 206 of the housing. The interface portion 204 of the housing 202 has restricted borehole 206a having a third diameter at the first temperature, and a fourth diameter at the second temperature.

Although the interface portion can be located anywhere along the borehole to grip the ferrule, in one embodiment, it is located at the front of the housing 202, forward of the borehole 206. Although not required to practice the invention, such an embodiment has certain advantages. For example, if the interface portion is located at the forward end of the borehole, near the ferrule endface, which optically couples with the lens or mating structure, there is relatively little housing material undergoing expansion between the interface portion and the endface of the ferrule, and thus, the ferrule will move relatively little prior to the interface portion transitioning to a clearance fit. Conversely, if the interface portion were located further away from the ferrule endface—i.e., rearward of the optical coupling, the additional material of the housing between the interference portion and the ferrule endface would cause more rearward movement of the ferrule during thermal expansion of the ferrule before the interface portion transitioned from an interference fit to a clearance fit.

Additionally, in this embodiment, the interface portion has a relatively short length, $l_i$, which may be just a fraction of the length of the ferrule. Again, although not required to practice the invention, such an embodiment has certain advantages. First, because the interference fit is limited to a relatively small length of the ferrule (as opposed to the entire length of the borehole 206), it is relatively easy to control. In other words, when the temperature increases to the transition temperature and the interface portion transforms to a clearance fit, it will do so more predictably because there is less surface area and thus lower probability of surface anomalies impeding this transition. Although the length $l_i$ of the interface portion may vary, suitable results have been achieved with a length $l_i$ no greater than, for example, ½ the ferrule length $l_f$, and even shorter, for example, less than ⅓ the ferrule length $l_f$.

Figure 2:
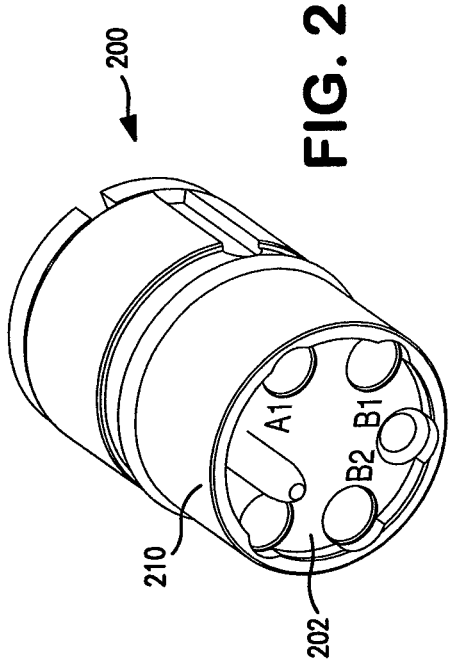
FIG. 2 shows a perspective view of an insert-type housing of an expanded beam connector.
Figure 5A:
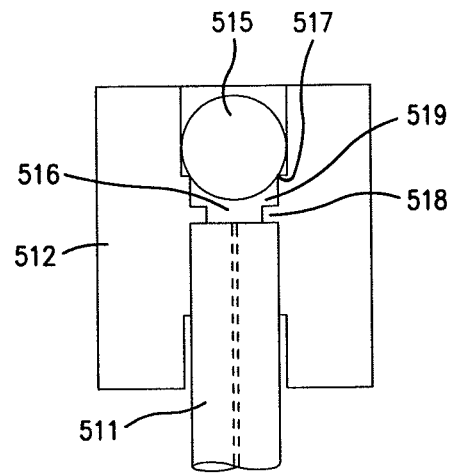
FIGS. 5(a)-5(d) show alternative connector configurations of the present invention.
Figure 5B:
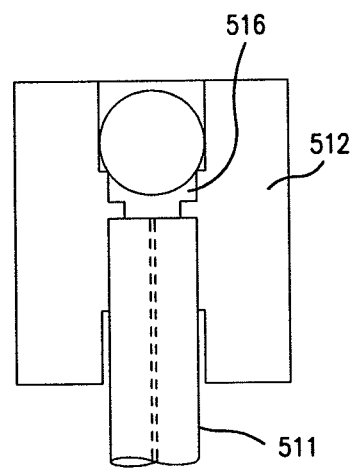

The connector of the present invention may be configured in different way to provide forward register the ferrule. For example, as shown in FIGS. 1 and 2, the ferrule may be registered in the housing by virtue of physical contact between the lens 205 and the endface 208 of the ferrule. Alternatively, the ferrule may be registered in the housing by virtue of stops or spacers as shown in FIGS. 5a-5d. Referring to FIG. 5a, stop 518 positions the ferrule 511 axially in the housing 512. So rather than the spring (not shown) urging the ferrule forward into the lens 515 to position it axially when the connector is in its clearance fit state, the spring urges the ferrule into the stop 518. In this particularly embodiment, the lens 515 is positioned in the housing by virtue of a second stop 517, thereby creating a space 516 between the lens and the endface of the ferrule. In this embodiment, the space is filled with an index matching gel 519 or another optically-transparent material. Referring to FIG. 5b, a connector configuration similar to that of FIG. 5a is shown except the space 516 is not filled with a gel but is an air gap.

Figure 5C:
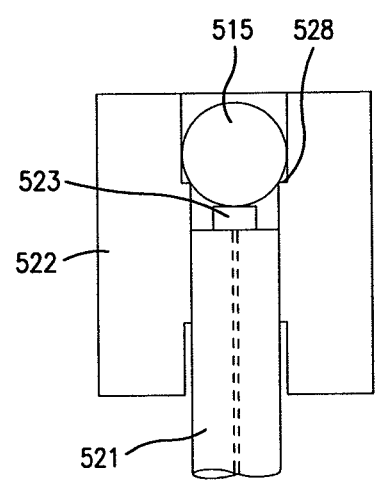

Referring to FIG. 5c, the connector employs a glass element 523 affixed to, or otherwise disposed between, the endface of the ferrule 521 and the lens as disclosed in U.S. Patent Publication No. 20080050073 (hereby incorporated by reference). The axial position of the ferrule 521 in the housing 522 is achieved by physically contacting the ferrule 521 against a stop to define a gap between the glass element 523 and the lens 515. As with the embodiments shown in FIGS. 5a and 5b, the lens 515 is positioned by virtue of a stop 528.

Figure 5D:
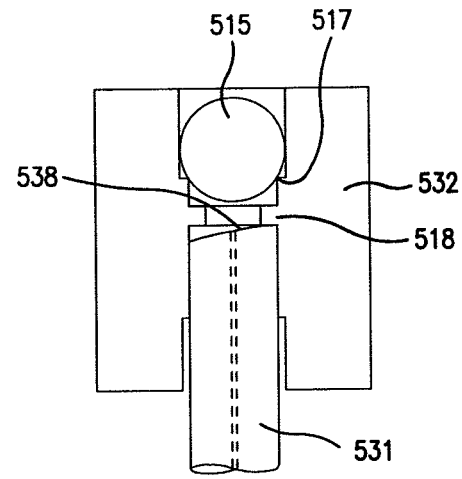

Referring to FIG. 5d, the housing 532 is similar in configuration to that shown in FIGS. 5a and 5b. Specifically, the stop 518 is used to position the ferrule 531 and stop 517 is used to position the lens 515. However, the endface 538 of the ferrule 531 in FIG. 5d is not polished perpendicularly to the optical axis, but rather is an angle (APC) polished ferrule.

The resilient member or spring 203 functions to provide a forward urging force to the ferrule. The spring may be any resilient member capable of providing axial force when compressed. Although this urging force has no effect on the ferrule when the connector is in its interference state, if the temperature exceeds or drops below the transition temperature, and the interface transitions to a clearance fit, the spring will urge the ferrule forward and maintain its proper register or axial position in the housing. For example, if the connector has a lens and the ferrule makes physical contact with the lens, then the spring will urge the ferrule against the lens above the transition temperature. On the other hand, if the connector has an air gap between the ferrule and the lens, or if no lens is used, then the ferrule may be pushed against a stop or other structure in the housing to maintain its proper axial position above the transition temperature.

The lens 105 functions, in one respect, to expand and collimate a relatively narrow optical beam emitted from a fiber into a relatively large beam for transmission through an air gap and into the light path of a mating structure, and, in another respect, to focus a relatively large collimated beam from the mating structuring into the fiber. Suitable lenses include any optical component that is capable of expanding/focusing a light beam, and include, for example, a ball lens, a GRIN lens, or a lens or lens assembly containing spherical or aspherical surfaces with uniform or graded index lenses.

Figure 2B:
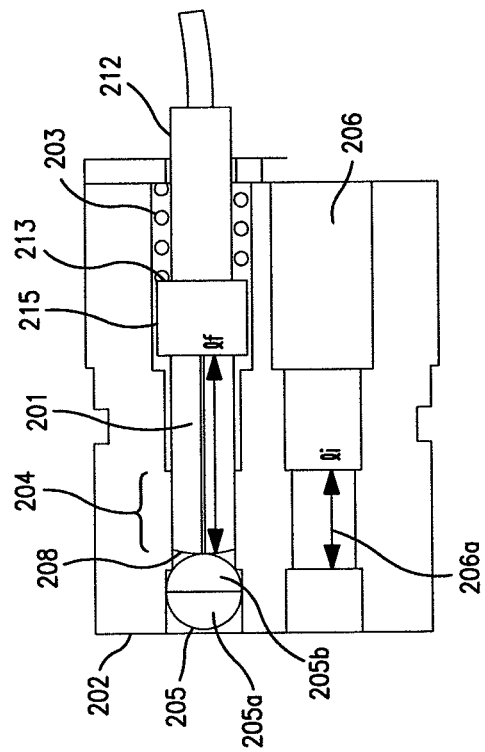
FIGS. 2(a) and 2(b) show a front view and a cross-sectional view of the housing of FIG. 2.
Figure 2A:
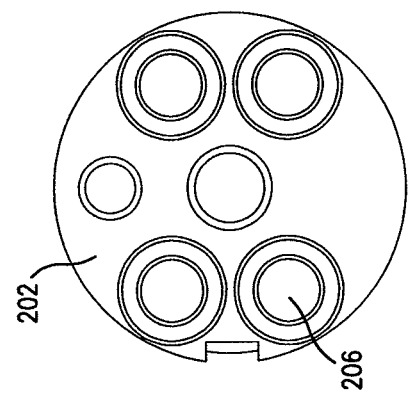
Figure 4B:
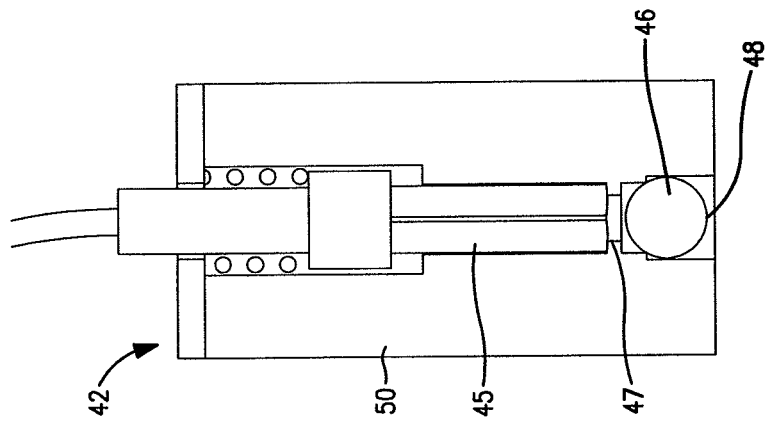
FIGS. 4(a) and 4(b) show schematics of prior art single mode and multimode expanded beam connector inserts.
Figure 4A:
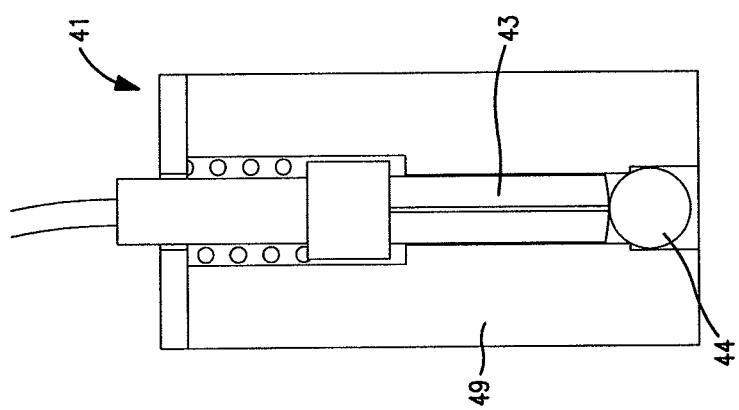

In one embodiment, the lens 205 is a ball lens coated with an antireflective (AR) material 205a for an air/glass interface. For an air-to-glass interface, an ideal coating will have an index of sqrt(n) where n is the index of refraction of the lens material relative to air. The coating thickness is $\lambda/(4n)$ where $\lambda$ is the wavelength in air. The coating may be applied only at the region that the light path passes through the lens, or it may be applied uniformly around the ball lens for simplicity and ease of manufacture (i.e., no need to align the lens in the housing). If physical contact is used between the lens and the ferrule, then one hemisphere is AR coated for an air/glass interface and the other hemisphere is AR coated with a material 205b for a glass/glass interface as shown in FIG. 2b.

Another aspect of the invention is a method for manufacturing the connector. Specifically, the method involves exploiting the clearance and interference states of the connector to facilitate manufacturing—i.e., the connector is assembled/disassembled in its clearance state, but operated generally in its interference state. The assembly method involves (a) either heating the housing or cooling the ferrule such that clearance between the two components is achieved, (b) inserting the ferrule in the housing, (c) disposing the resilient member behind the ferrule to urge the ferrule forward relative to the housing, and (d) and allowing the temperature of the housing to drop or that of the ferrule to rise such that the connector transitions from a clearance state to an interference state while the ferrule is biased forward. Because of the low clearance between the ferrule and housing mentioned above, while the connector is in its clearance state (i.e., when the housing is heated or ferrule cooled), the axial alignment of the components is very good. Additionally, because the resilient member biases the ferrule forward, it holds the ferrule in its correct axial position while in the clearance state. Therefore, as the temperature of the components in the assembled connector moves toward room temperature (or other desired operating temperature), the connector transitions to its interference state with the ferrule and housing properly positioned.

Referring now to the connector of the first configuration depicted in FIGS. 1(a) and 1(b), in one embodiment of the method of the present invention, the housing 102 (and possibly even the ferrule) is heated to temperature such that the diameter of the restricted borehole expands beyond (e.g. greater than about 1 μm) the diameter of the ferrule allowing the housing to receive the ferrule with a clearance fit. Alternatively, in the second configuration of the connector shown in FIGS. 1(c) and 1(d), the ferrule (and possibly even the housing) is cooled to a temperature such that its diameter is less than the diameter of the restricted borehole. As the temperature of the housing drops (in the first configuration) or that of the ferrule increases (in the second configuration), the ferrule will be secured in the housing by an interference fit as described above.

The lens (if used) may be disposed in the housing while the housing is heated or after it cools. If a lens is used and physical contact between it and the ferrule is desired, it may be beneficial to adhere the lens to the housing before it is heated, and then insert the spring prior to the housing cooling. This way, the spring will urge the ferrule into the lens as the fit between the interface portion and the ferrule transforms from a clearance fit to an interference fit during the cooling of the housing. Likewise, if the ferrule is designed to seat against a stop in the housing, it may be beneficial to install the spring in the housing before the housing cools such that the spring urges the ferrule against the stop during the cooling phase.

It may beneficial to polish the endface of the ferrule to provide a specific geometry. Furthermore, it may be desirable to affix a glass element to the ferrule or use a glass element as a spacer combined with gel. It may be desirable to apply an AR-coated glass element as disclosed in US Publication no. 20080050073, hereby incorporated by reference.

As mentioned above, the clearance state of the connector can also be exploited to facilitate disassembly and possible repair of the components. For example, if a defective fiber or ferrule is detected, the connector may be heated or cooled beyond the transition temperature such that the connector transitions to a clearance state, thereby allowing the ferrule to be removed from the housing with no damage to the housing. For example, in the first configuration, the connector is heated to at least the second temperature such that the diameter of the restricted borehole expands to at least the fourth diameter $d_4$. Even though the ferrule is also expanding to its second diameter $d_2$, because $d_4$ is larger than $d_2$, there is still a clearance fit between the restricted borehole and the ferrule. Alternatively, in the connector of the second configuration shown in FIGS. 1(c) and 1(d), the connector is cooled to the first temperature such that the ferrule diameter contracts to at least the first diameter $d_1$. Although the restricted borehole diameter will also contract to $d_3$, because $d_1$ is smaller than $d_3$, there is still a clearance fit between the restricted borehole and the ferrule.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An optical connector having a front and back orientation, said connector comprising:
    a ferrule comprising a first material having a first coefficient of thermal expansion (COE), and having a first diameter at a first temperature, and a second diameter at a second temperature, said ferrule also comprising an endface;
    a housing comprising a second material having a second COE, said housing having a restricted borehole having a third diameter at said first temperature, and a fourth diameter at said second temperature;
    a resilient member disposed in said housing and in contact with said ferrule to apply a forward urging force to said ferrule;
    wherein said connector has a first and second configuration, in said first configuration, said second COE is greater than said first COE, said first diameter is greater than said third diameter such that said connector is in an interference state at said first temperature, and said second diameter is less than said fourth diameter such that said connector is in a clearance state at said second temperature, in said second configuration, said second COE is less than said first COE, said first diameter is less than said third diameter such that said connector is in said clearance state at said first temperature, and said second diameter is greater than said fourth diameter such that said connector is in said interference state at said second temperature; and
    wherein clearance between the ferrule and the housing is less than 0.5 μm at room temperature.

2. The connector of claim 1, wherein said connector is in said interference state at room temperature.

3. The connector of claim 1, wherein said clearance is less than necessary for a clearance fit at room temperature.

4. The connector of claim 1, wherein said connector is in said interference state for a majority of its operating temperature range.

5. The connector of claim 1, wherein said connector is in said interference state from at least room temperature down to its lowest operating temperature.

6. The connector of claim 5, wherein said connector has an operating temperature range of about −46 to 71° C.

7. The connector of claim 1, wherein said connector transitions from its interference state to its clearance state either in or above the top third of its operating temperature range in said first configuration, or in or below the bottom third of said operating temperature range in said second configuration.

8. The connector of claim 7, wherein said connector transitions from its interference state to its clearance state either above about 32° C. in said first configuration, or below about −7° C. in said second configuration.

9. The connector of claim 1, further comprising:
    a lens disposed within said housing.

10. The connector of claim 9, wherein said endface is in physical contact with said lens.

11. The connector of claim 9, wherein said housing defines a stop, said ferrule endface contacting said stop to register the endface in said housing.

12. The optical connector of claim 11, wherein said endface and said lens are spaced apart to form an air gap.

13. The optical connector of claim 11, wherein said endface and said lens are spaced apart to form a gap filled with an optical gel or an optically-transparent material.

14. The optical connector of claim 9, wherein said endface has an angle polish.

15. The connector of claim 9, wherein said housing defines a second stop, said lens contacting said second stop to register the lens in said housing.

16. The connector of claim 1, wherein said restricted borehole has a length less than ½ the length of said ferrule.

17. An optical connector having a front and back orientation, said connector comprising:
 a ferrule comprising a first material having a first coefficient of thermal expansion (COE), and having a first diameter at a first temperature, and a second diameter at a second temperature, said ferrule also comprising an endface;
 a housing comprising a second material having a second COE, said housing having a restricted borehole having a third diameter at said first temperature, and a fourth diameter at said second temperature;
 a resilient member disposed in said housing and in contact with said ferrule to apply a forward urging force to said ferrule;
 wherein said connector has a first and second configuration, in said first configuration, said second COE is greater than said first COE, said first diameter is greater than said third diameter such that said connector is in an interference state at said first temperature, and said second diameter is less than said fourth diameter such that said connector is in a clearance state at said second temperature, in said second configuration, said second COE is less than said first COE, said first diameter is less than said third diameter such that said connector is in said clearance state at said first temperature, and said second diameter is greater than said fourth diameter such that said connector is in said interference state at said second temperature; and
 wherein said connector is in said interference state for a majority of its operating temperature range.

18. The connector of claim 17, wherein said connector has an operating temperature range of about −46 to 71° C.

19. The connector of claim 17, wherein said connector transitions from its interference state to its clearance state either in or above the top third of an operating temperature range in said first configuration, or in or below the bottom third of said operating temperature range in said second configuration.

20. The connector of claim 17, wherein said connector transitions from its interference state to its clearance state either above about 32° C. in said first configuration, or below about −7° C. in said second configuration.

21. A method for assembling a connector, said connector comprising a ferrule, a housing, and a resilient member, said ferrule having an outer diameter, said housing having a restricted borehole having an inner diameter, said method comprising:

(a) either heating said housing or cooling said ferrule such that clearance between said outer diameter of said ferrule and said inner diameter of said restricted borehole is achieved,
 (b) after step (a), inserting said ferrule into said restricted borehole of said housing,
 (c) disposing said resilient member in said housing to urge the ferrule forward relative to said housing, and
 (d) after steps (b) and (c), allowing the temperature of said housing to drop or the temperature of said ferrule to raise such that said connector transitions from a clearance state to an interference state while said ferrule is biased forward with said resilient member.

22. The method of claim 21, wherein, in step (d), said connector is allowed to reach room temperature.

23. The method of claim 21, further comprising:
 inserting a lens in said housing prior to allowing said housing to cool.

24. The method of claim 21, wherein said ferrule comprises a first material and said housing comprises a second material, said first and second materials having different coefficients of thermal expansion.

25. A method for disassembling a connector, said method comprising:
 (a) providing said connector comprising a ferrule, a housing and a resilient member, said ferrule comprising a first material and having a first diameter at said first temperature and a second diameter at a second temperature higher than said first temperature, said housing comprising a second material having a coefficient of thermal expansion different form that of said first material, and having a restricted borehole having a third diameter at said first temperature and a fourth diameter at said second temperature, said connector has a first and second configuration, in said first configuration, said second COE is greater than said first COE, said first diameter is greater than said third diameter such that said connector is in an interference state at said first temperature, and said second diameter is less than said fourth diameter such that said connector is in a clearance state at said second temperature, in said second configuration, said second COE is less than said first COE, said first diameter is less than said third diameter such that said connector is in said clearance state at said first temperature, and said second diameter is greater than said fourth diameter such that said connector is in said interference state at said second temperature;
 (b) either heating said connector of said first configuration to said second temperature or cooling said connector of said second configuration to said first temperature such that said connector transitions to a clearance state, said first and second temperature being within said operating temperature range;
 (c) removing said ferrule form said housing.

26. The method of claim 25, wherein said first temperature is below −7° C., and said second temperature is above 32° C.

* * * * *